(12) United States Patent
Middleton et al.

(10) Patent No.: US 9,143,547 B2
(45) Date of Patent: Sep. 22, 2015

(54) STREAMING VIDEO OVER A WIRELESS NETWORK

(71) Applicant: Microsoft Technolgy Licensing, LLC, Redmond, WA (US)

(72) Inventors: Justin Middleton, San Francisco, CA (US); David Mendenhall, Palo Alto, CA (US); Andreas Atkins, Campbell, CA (US); Mandar Arun Khadilkar, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/468,112

(22) Filed: Aug. 25, 2014

(65) Prior Publication Data

US 2014/0365679 A1 Dec. 11, 2014

Related U.S. Application Data

(63) Continuation of application No. 12/062,062, filed on Apr. 3, 2008, now Pat. No. 8,819,741.

(51) Int. Cl.
*H04N 7/173* (2011.01)
*H04N 21/6375* (2011.01)
(Continued)

(52) U.S. Cl.
CPC .......... *H04L 65/608* (2013.01); *H04L 65/4084* (2013.01); *H04L 65/605* (2013.01); *H04L 65/80* (2013.01); *H04L 67/04* (2013.01);
(Continued)

(58) Field of Classification Search
CPC H04L 65/08; H04M 3/42178; H04N 21/2223

USPC .......... 725/62, 88–90, 102; 455/421; 370/218
See application file for complete search history.

(56) References Cited

U.S. PATENT DOCUMENTS 6,396,805 B2   5/2002   Romrell
6,477,373 B1   11/2002  Rappaport et al.
(Continued)

OTHER PUBLICATIONS

"Final Office Action", U.S. Appl. No. 12/062,062, Feb. 18, 2011, 9 pages.
(Continued)

*Primary Examiner* — Pankaj Kumar
*Assistant Examiner* — Reuben M Brown
(74) *Attorney, Agent, or Firm* — Bryan Webster; Kate Drakos; Micky Minhas

(57) ABSTRACT

Streaming video to a wireless device is described. For example, one embodiment of a computer-implemented method for providing a multimedia stream to a wireless device over a wireless network comprises: receiving a request for a video stream from a wireless device; requesting the video stream from a streaming server on behalf of the wireless device; streaming the video stream from the streaming server and storing the video stream or portions thereof in a buffer; streaming the video stream from the buffer to the wireless device; detecting that the wireless device has lost communication with the wireless network; sending a command to the streaming server to pause the streaming of the video stream and maintaining a network connection to the remote streaming server; detecting that the wireless device has regained communication with the wireless network; determining a point within the video stream at which the wireless device lost communication; and resuming streaming of the video stream to the wireless device at the determined point within the video stream.

20 Claims, 5 Drawing Sheets

(51) Int. Cl.

| | | |
|---|---|---|
| | *H04L 29/06* | (2006.01) |
| | *H04N 21/2343* | (2011.01) |
| | *H04N 21/2387* | (2011.01) |
| | *H04N 21/414* | (2011.01) |
| | *H04N 21/4363* | (2011.01) |
| | *H04N 21/61* | (2011.01) |
| | *H04L 29/08* | (2006.01) |
| | *H04M 3/42* | (2006.01) |
| | *G06F 15/16* | (2006.01) |

(52) U.S. Cl.
CPC ........... *H04L 67/28* (2013.01); *H04L 67/2823* (2013.01); *H04M 3/42178* (2013.01); *H04N 7/17318* (2013.01); *H04N 21/2343* (2013.01); *H04N 21/2387* (2013.01); *H04N 21/41407* (2013.01); *H04N 21/43637* (2013.01); *H04N 21/6125* (2013.01)

(56) References Cited

U.S. PATENT DOCUMENTS

| | | | |
|---|---|---|---|
| 6,640,244 B1* | 10/2003 | Bowman-Amuah | 709/207 |
| 7,664,067 B2* | 2/2010 | Pointer | 370/328 |
| 8,364,159 B2 | 1/2013 | Turner | |
| 8,819,741 B2* | 8/2014 | Middleton et al. | 725/62 |
| 2002/0073205 A1* | 6/2002 | Mostafa | 709/227 |
| 2003/0120811 A1 | 6/2003 | Hanson et al. | |
| 2004/0220726 A1 | 11/2004 | Jin et al. | |
| 2006/0009213 A1 | 1/2006 | Sturniolo et al. | |
| 2007/0165572 A1 | 7/2007 | Lenzarini | |
| 2007/0218912 A1 | 9/2007 | Song et al. | |
| 2007/0240209 A1 | 10/2007 | Lewis et al. | |
| 2008/0201225 A1 | 8/2008 | Maharajh et al. | |
| 2009/0094317 A1 | 4/2009 | Venkitaraman | |
| 2009/0204721 A1* | 8/2009 | Yost et al. | 709/232 |
| 2009/0254948 A1 | 10/2009 | Middleton | |
| 2009/0320077 A1 | 12/2009 | Gazdzinski | |
| 2010/0095337 A1 | 4/2010 | Dua | |
| 2014/0365679 A1* | 12/2014 | Middleton | 709/231 |

OTHER PUBLICATIONS

"Non-Final Office Action", U.S. Appl. No. 12/062,062, Oct. 13, 2010, 8 pages.

"Notice of Allowance", U.S. Appl. No. 12/062,062, Apr. 15, 2014, 4 pages.

* cited by examiner

STREAMING VIDEO OVER A WIRELESS NETWORK

RELATED APPLICATIONS

This application is a continuation of and claims priority to U.S. patent application Ser. No. 12/062,062 filed Apr. 3, 2008 entitled "System and Method for Streaming Video over a Wireless Network." The entire teachings of the above application is incorporated herein by reference.

BACKGROUND

The set of network protocols which enable communication over the Internet is sometimes referred to as the TCP/IP protocol suite, after its two most well known protocols: the Transmission Control Protocol ("TCP") and the Internet Protocol ("IP"). The TCP protocol, which resides at the "transport" layer of the Internet protocol stack, is a reliable, connection-oriented protocol which ensures that data arrives at its destination undamaged and in order. In addition, the TCP layer continuously measures network load and throttles its sending rate in order to avoid overloading the network. The IP protocol performs the basic task of moving packets of data from source to destination using IP addresses. IP can carry data for a number of different higher level protocols, each of which are identified by a unique IP Protocol Number.

In order to establish communication with a remote host on a TCP/IP network, a "socket" connection to the remote host must be established. A socket is defined by the combination of the IP address of the remote host and a port number identifying a remote application type. For example, port 80 is the standard port number for Hypertext Transport Protocol ("HTTP") traffic, and port 80 packets are typically processed by a Web server.

A variety of wireless messaging and personal information management (PIM) devices have been introduced over the past few years including, for example, the T-Mobile Sidekick LX designed by the assignee of the present application. The TCP/IP protocol is used by many of these devices to communicate over wireless networks (e.g., the General Packet Radio Service ("GPRS") used on GSM networks). Consequently, in order to communicate with a remote host, these devices must open and maintain a socket connection to the remote host in the same manner as wired computer systems (e.g., PC desktops and notebooks).

One problem with this scenario is that, due to the inherent unreliability of wireless networks, wireless socket connections may not be suitable for certain types of applications. For example, stream-based applications such as Secure Shell ("SSH") connections require a significant amount of initialization overhead in order to establish (e.g., negotiating encryption variables, user authentication data, etc) and must be maintained over a relatively long period of time (i.e., in comparison to transaction-based applications such as Web browsing). Similarly, when a user is viewing a video or audio stream over a wireless network and the wireless connection is temporarily broken, the user must reconnect to the remote server and start the video or audio stream from the beginning. For these types of connections, when a socket is closed (e.g., due to an unreliable wireless network) it is typically quite burdensome on the end user, who loses all state information associated with the connection and must then take the time to reestablish the connection with the remote server.

Accordingly, what is needed is an improved mechanism for maintaining connections with remote servers over a wireless network.

SUMMARY

A system and method are described for streaming video to a wireless device. For example, one embodiment of a computer-implemented method for providing a multimedia stream to a wireless device over a wireless network comprises: receiving a request for a video stream from a wireless device; requesting the video stream from a streaming server on behalf of the wireless device; streaming the video stream from the streaming server and storing the video stream or portions thereof in a buffer; streaming the video stream from the buffer to the wireless device; detecting that the wireless device has lost communication with the wireless network; sending a command to the streaming server to pause the streaming of the video stream and maintaining a network connection to the remote streaming server; detecting that the wireless device has regained communication with the wireless network; determining a point within the video stream at which the wireless device lost communication; and resuming streaming of the video stream to the wireless device at the determined point within the video stream.

BRIEF DESCRIPTION OF THE DRAWINGS

A better understanding of the present invention can be obtained from the following detailed description in conjunction with the following drawings, in which.

DETAILED DESCRIPTION

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Figure 1:
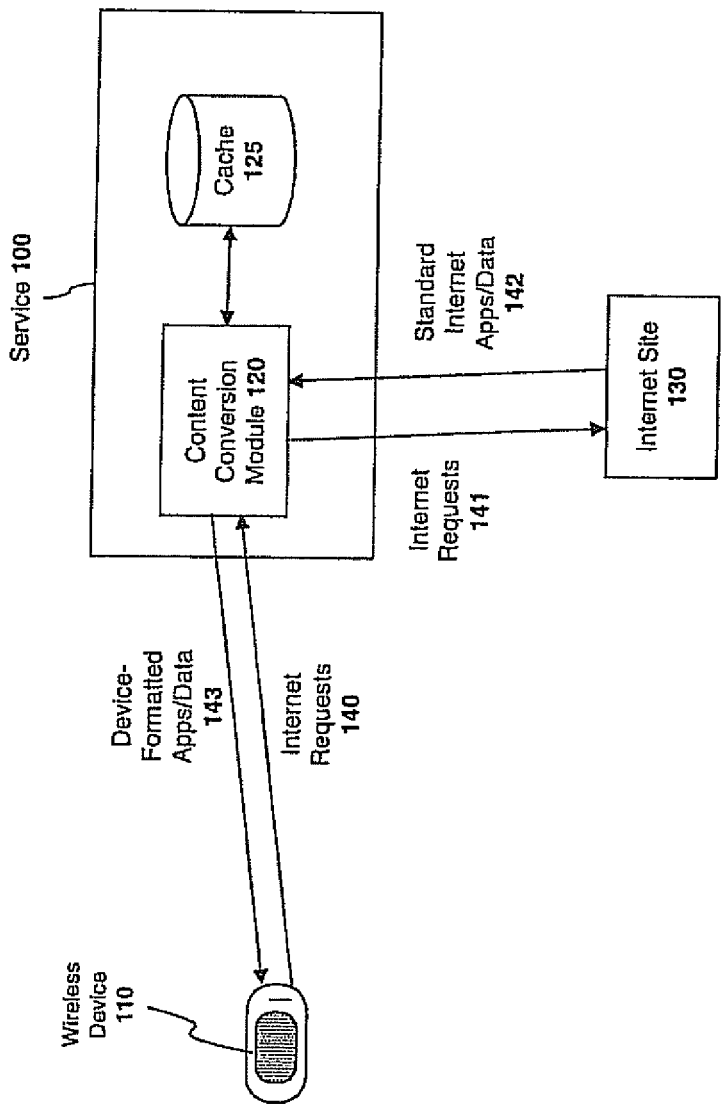
FIG. 1 illustrates a service communicating with a data processing device according to one embodiment of the invention.

Various embodiments may be implemented on a wireless device 110 which communicates with a data processing service 100 as illustrated generally in FIG. 1. Embodiments of a service 100 and data processing device 110 are described in U.S. Pat. No. 6,721,804 entitled NETWORK PORTAL SYSTEM, APPARATUS AND METHOD, Ser. No. 09/714,897, filed Nov. 15, 2000, which is assigned to the assignee of the present application and which is incorporated herein by reference. Certain features of the service 100 and an exemplary data processing device 110 will now be described followed by a detailed description of a system and method for streaming video to a wireless device using a service. As an initial matter, however, it should be noted that the specific data processing device and system architecture described in U.S. Pat. No. 6,721,804 are not required for implementing the underlying principles of the invention. Rather, the embodiments of the invention described below may be implemented on virtually any type of data processing device including standard personal computers, personal digital assistants and wireless telephones.

In one embodiment, the service 100 converts standard applications and data into a format which each data processing device 110 can properly interpret. Thus, as illustrated in FIG. 1, one embodiment of the service 110 includes content conversion logic 120 for processing requests for Internet content 140. More particularly, the service 100 acts as a proxy for the data processing device 110, forwarding Internet requests 140, 141 to the appropriate Internet site 130 on behalf of the data processing device 110, receiving responses from the Internet site 130 in a standard Internet format (e.g., Web pages with embedded audio/video and graphical content, e-mail messages with attachments, . . . etc), and converting the standard Internet responses 124 into a format which the data processing device 110 can process (e.g., bytecodes as described in the co-pending applications).

For example, the conversion logic 120 may include a hypertext markup language ("HTML") rendering module (not shown) for interpreting HTML code and downloading any embedded content in the HTML code (e.g., graphics, video, sound, . . . etc) to the service 100. The conversion logic 120 may then combine the HTML code and embedded content and generate a set of bytecodes for accurately reproducing the requested content on the data processing device 110. As described above, in one embodiment, the bytecodes may be Java bytecodes/applets. However, the conversion logic 120 may generate various other types of interpreted and/or non-interpreted code, depending on the particular type of data processing device 110 being used (e.g., one with an interpreter module or one without).

Because one embodiment of the service 100 maintains an intimate knowledge of the capabilities/configuration of each data processing device 110 (e.g., screen size, graphics/audio capabilities, available memory, processing power, user preferences, . . . etc) it can reconstruct the requested Internet content accurately, while at the same time minimizing the bandwidth required to transmit the content to the device 110. For example, the conversion logic 120 may perform pre-scaling and color depth adjustments to the requested content so that it will be rendered properly within the data processing device's 110's display. In making these calculations, the conversion may factor in the memory and processing power available on the data processing device 110. In addition, the conversion logic 120 may compress the requested content using a variety of compression techniques, and thereby preserve network bandwidth.

System and Method for Preserving Socket Connections in a Wireless Network

Figure 2:
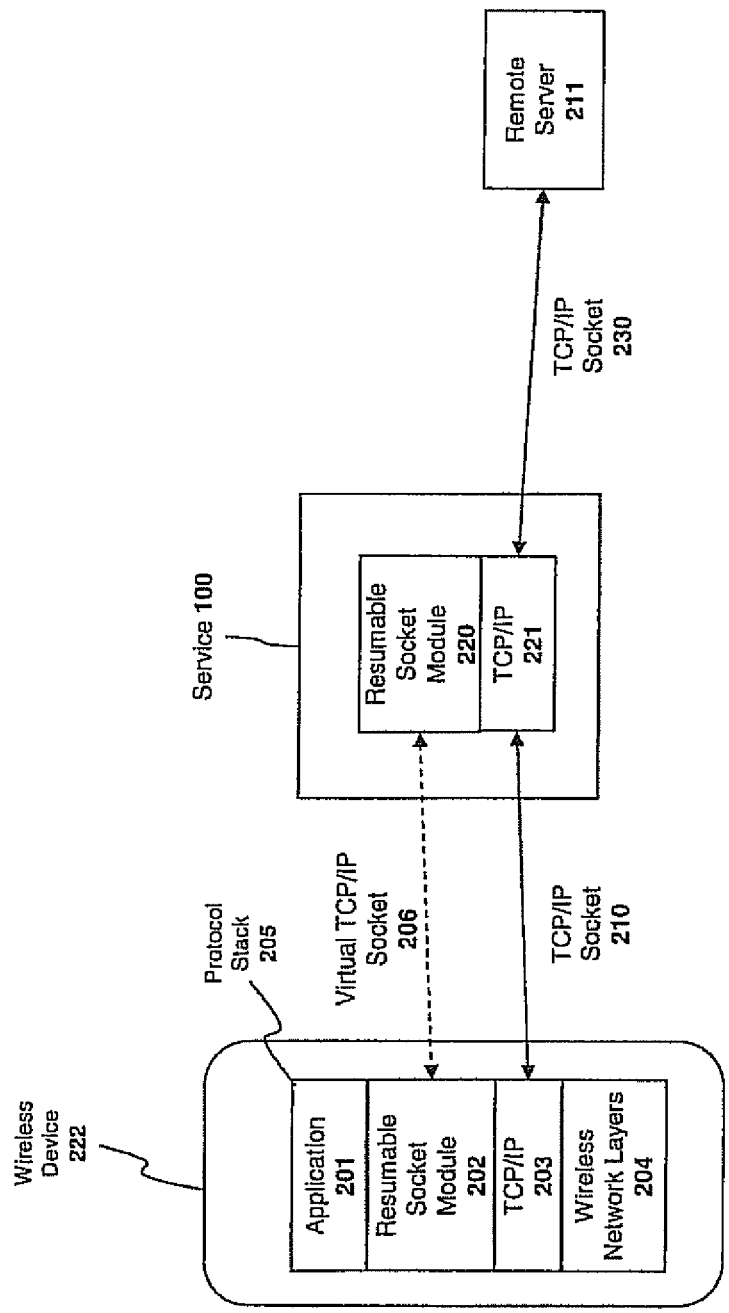
FIG. 2 illustrates a system employing resumable socket functionality according to one embodiment of the invention.

To solve the connectivity problems associated with wireless socket connections described above, the assignee of the present application developed techniques for emulating an open socket connection even when wireless connectivity is temporarily lost. These techniques are described in the co-pending U.S. patent application ENTITLED SYSTEM AND METHOD FOR PRESERVING SOCKET CONNECTIONS OVER A WIRELESS NETWORK, Ser. No. 11/305,789, which is assigned to the assignee of the present application and which is incorporated herein by reference. Specifically, as illustrated in FIG. 2, in one embodiment, a resumable socket module 202 is configured above the TCP/IP layer 203 of the network protocol stack 205 on the wireless device 222. In this embodiment, the resumable socket module 202 acts as an interface between the TCP/IP layer 203 and applications 201 which require network communication (e.g., SSH clients, Web browsers, email clients, etc). The client-side protocol stack 205 also includes a set of wireless network layers 204 for supporting wireless communication at the data link/physical tier of the OSI protocol stack (e.g., GPRS/GSM wireless network layers). The technical details of these layers are well known and are not pertinent to the underlying principles of the invention.

In one embodiment, the resumable socket module 202 coordinates with a corresponding service-side resumable socket module 220 at the data service 100 to emulate an open socket connection even when wireless connectivity is temporarily lost (illustrated in FIG. 2 as a "virtual" socket connection 206). Specifically, in one embodiment, the resumable socket modules 202 and 220 on the wireless device 220 and service 100, respectively, monitor the number of bytes transmitted and received between the application 201 and remote server 211. Even when the wireless device 222 loses network connectivity (e.g., due to the user moving out of range), the service 100 maintains an open socket connection 230 with the remote server 211 on behalf of the user. In one embodiment, the service 100 maintains the open socket connection 230 for a specified time period (e.g., 5 minutes). If the wireless device 222 reconnects to the wireless network within this specified time period, the resumable socket module 202 on the client and the resumable socket module 220 on the service 100 communicate with one another to synchronize the data transmitted/received. Thus, because the user's session with the remote server 211 is preserved, the user will not lose any session state information and will not be burdened with re-connecting and re-authenticating with the remote server.

In one embodiment, the TCP/IP layer 203 is implemented using the Java Application Programming Interface ("API") for TCP sockets. The resumable socket module 202 then communicates with the TCP/IP module by invoking methods via the Java sockets API. See, e.g., Calvert, TCP/IP Sockets in Java: Practical Guide for Programmers (Morgan Kaufmann 2002) for additional detail related to Java TCP socket implementations. It should be noted, however, that the particular type of program code used within the network stack 205 is not pertinent to the underlying principles of the invention.

Figure 3:
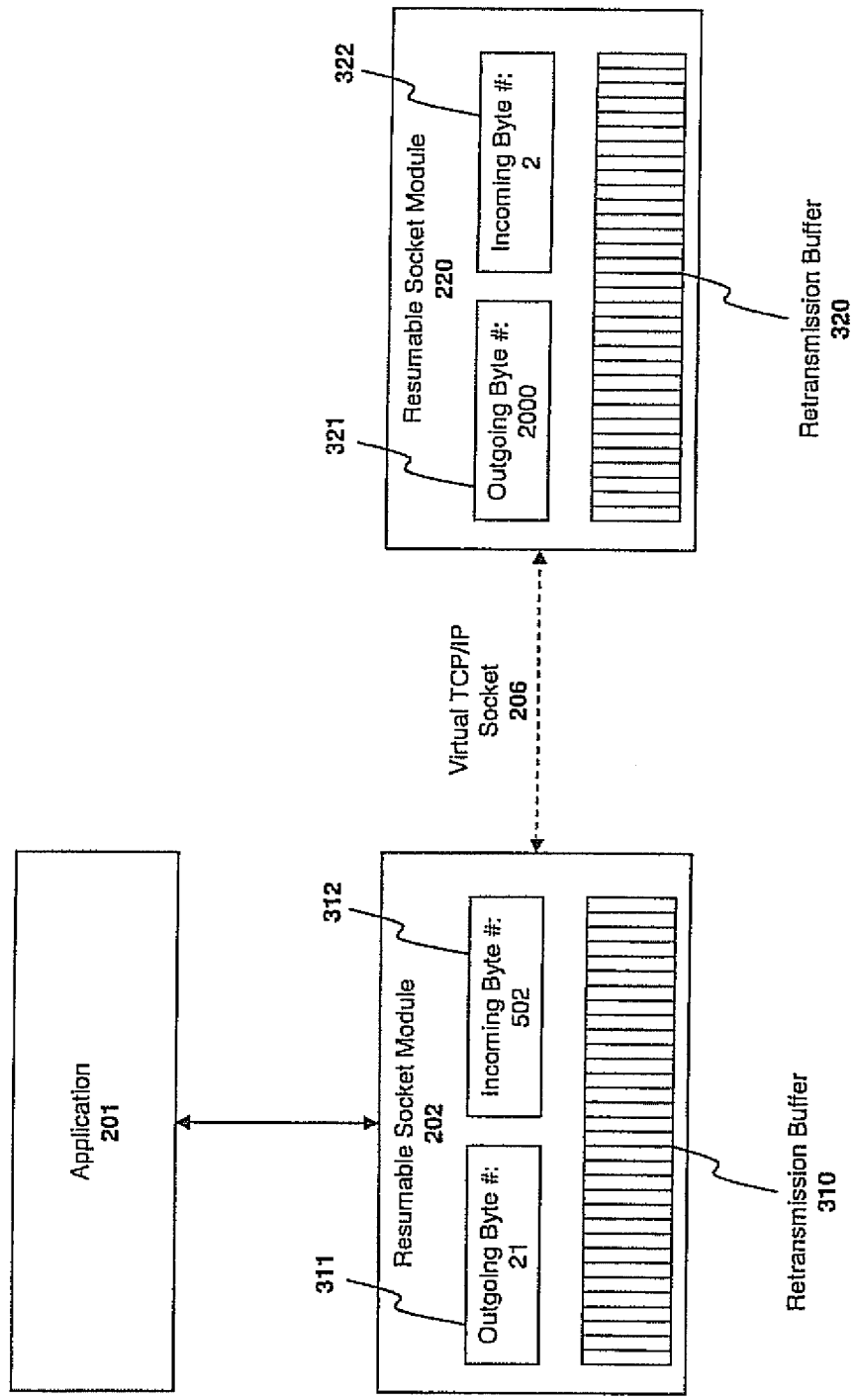
FIG. 3 illustrates a resumable socket module according to one embodiment of the invention.

FIG. 3 illustrates additional detail for implementing a virtual socket connection 300 between applications 201 and the resumable socket modules 202 and 220. In this embodiment, the resumable socket modules 202 and 220 count and maintain an indication of the last byte transmitted and received. Specifically, counter modules 311 and 321 track the last byte transmitted from the device's resumable socket module 202 and the service's resumable socket module 220, respectively, and counter modules 312 and 322 maintain an indication of the last byte received from the device's resumable socket module 202 and the service's resumable socket module 220, respectively.

In addition, in one embodiment, retransmission buffers 310 and 320 are maintained by each of the resumable socket modules 202 and 220, respectively. The retransmission buffers 310 and 320 may be implemented as predefined regions in memory which store a specified number of bytes transmitted from resumable socket module 202 and resumable socket module 320, respectively (e.g., 32 kBytes, 16 kBytes, etc). This allows the resumable socket modules 202 and 220 to transmit the bytes stored therein in the event that the wireless connectivity of the wireless device is temporarily lost.

Figure 4:
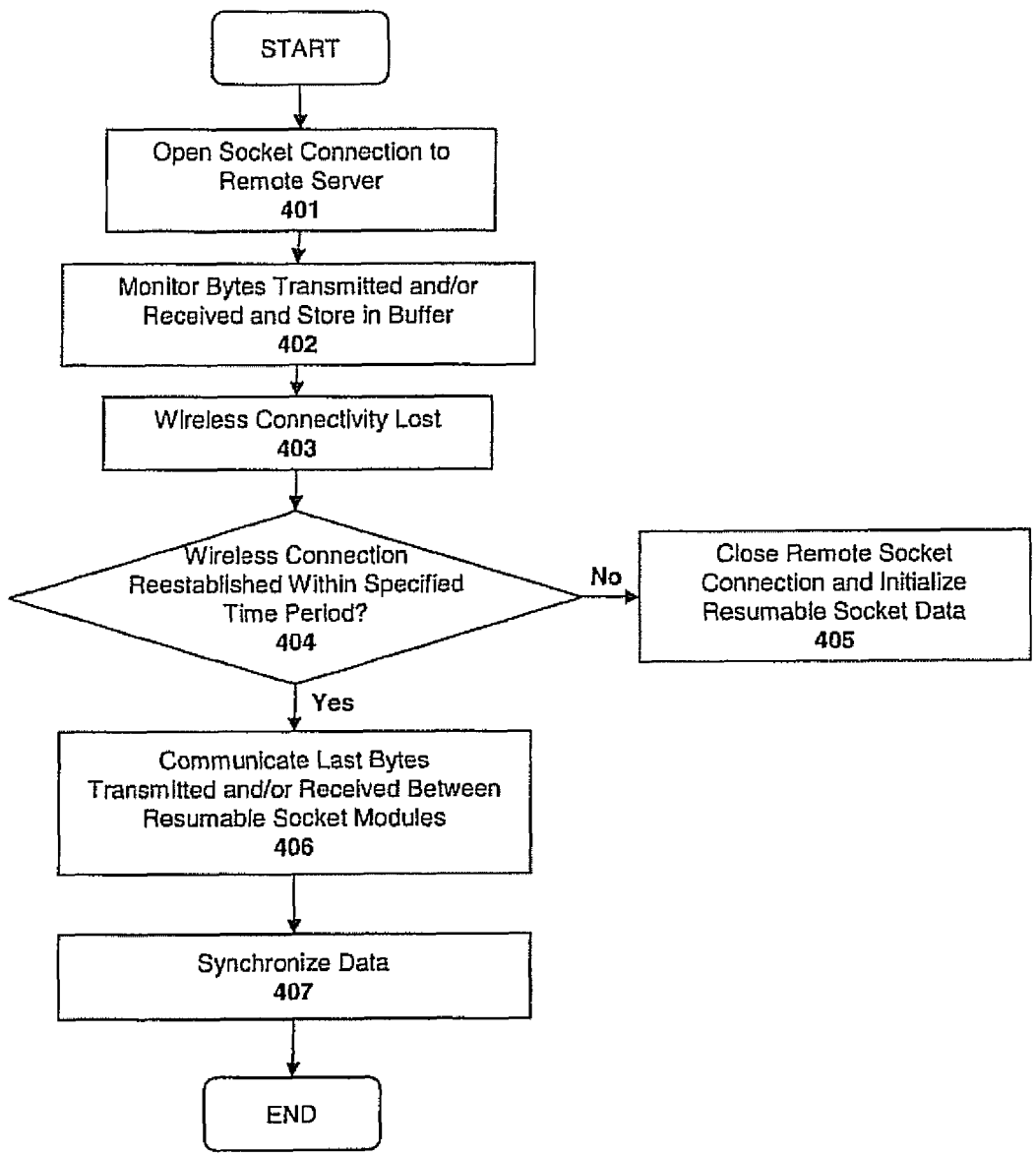
FIG. 4 illustrates a method according to one embodiment of the invention.

FIG. 4 illustrates a method for emulating an open socket connection performed by the resumable socket modules 202 and 220 on the wireless device 222 and service 100, respectively. At 401, a user establishes a TCP socket connection with a remote server (e.g., an SSH session via an SSH client). As mentioned above, this may involve the exchange of authentication data (e.g., user name and password) and/or encryption data (e.g., public/private keys).

At 402, the resumable socket modules on the wireless device 222 and the service 100 begin counting the number of bytes transmitted and received over the new socket connection and temporarily buffering the bytes transmitted. As mentioned above, this may be accomplished via counter modules 311, 312, 321, and 322; and retransmission buffers 310 and 320. At 403, the wireless device 222 loses it's connection to the wireless network. Nonetheless, at this stage, the resumable socket module 202 on the wireless device 222 emulates an open socket connection with the network application 201 on the wireless device and the resumable socket module 220 on the service 100 maintains the open socket connection with the remote server 211 on behalf of the wireless device 222. Thus, the socket connection is preserved notwithstanding the fact that the wireless network is temporarily unavailable.

As mentioned above, in one embodiment, the service 100 maintains the open socket connection 230 for a specified period of time (e.g., 5 minutes). If wireless connectivity is not reestablished with the wireless device 222 during that period of time, determined at 404, then at 405, the socket connection 230 with the remote server 211 is closed and the counter values and the raw data stored within the buffers 310, 320 within the resumable socket modules is cleared.

If, however, the device's wireless connectivity is reestablished with the specified period of time then, at 406, the resumable socket modules 202 and 220 communicate to identify the data that needs to be (re)transmitted from each of the retransmission buffers 310 and 320, respectively, and synchronize this data at 407. For example, in one embodiment, the resumable socket module 202 on the wireless device sends a message to the resumable socket module 220 on the service indicating the number of the last incoming byte that it received. The resumable socket module 220 on the service then transmits those bytes yet to be received by the resumable socket module 202 on the wireless device. For example, if the resumable socket module 202 on the wireless device indicates that the last byte that it received is byte #502 and the outgoing byte number stored within the outgoing counter 321 on the service is #2000, as illustrated in FIG. 3, then the resumable socket module 220 transmits bytes #503 to 2000 from the retransmission buffer 320. Alternatively, in one embodiment, the resumable socket module 220 on the service may first transmit an indication that the outgoing byte number stored in its outgoing counter 321 is #2000. In response, the resumable socket module 202 on the wireless device may request byte #'s 503 through 2000 from the resumable socket module 220 on the service 100, which resumable socket module 220 will then transmit. Various alternate/additional synchronization mechanisms may be employed while still complying with the underlying principles of the invention.

The resumable socket module 220 on the service may be brought up to date in the same manner as described above. For example, if the resumable socket module 220 on the service indicates that the last byte that it received is byte #2 and the outgoing byte number stored within the outgoing counter 311 on the wireless device is #21, then the resumable socket module 202 transmits bytes #2 through 22 from its retransmission buffer 310.

In one embodiment of the invention described above, the resumable socket module 202 appears as a normal TCP (or UDP) connection to the application, i.e., providing the same API as a standard TCP connection. As a result, these embodiments are implemented transparently to existing applications (i.e., without the need to modify the existing application and/or the socket API). When the underlying (i.e., real) TCP connection is broken, the application simply sees that no data has arrived for a period of time, and outgoing data is stored temporarily within the retransmission buffer. After the device reconnects to the wireless network, the application will see incoming data arriving again. If the device is not able to reconnect, the application simply sees the socket disconnected (i.e., a few minutes after it actually happened).

One embodiment of the invention employs additional techniques to maintain a connection with a remote streaming server when streaming video and/or audio to a wireless device. Specifically, in one embodiment, when the wireless device temporarily loses its connection to the wireless network (and therefore the service 100) while streaming video, the service 100 pauses the video stream at the remote streaming server on behalf of the user. The service 100 may also continue to receive the video stream for a specified period of time after the wireless device loses its connection (prior to pausing the video). When the wireless device reconnects to the wireless network, the service 100 resumes the video stream from the correct point (i.e., the point where the wireless device lost contact with the wireless device).

Figure 5:
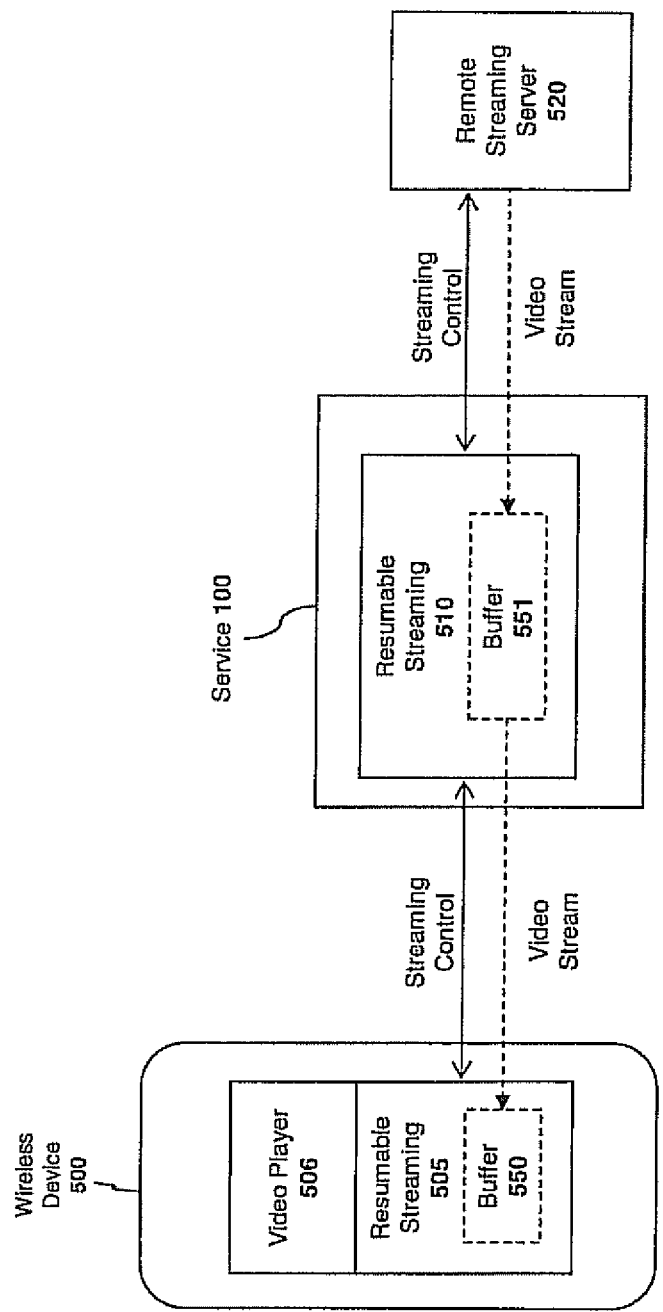
FIG. 5 illustrates a system architecture for streaming video to a wireless device according to one embodiment of the invention.

As illustrated in FIG. 5, this embodiment of the invention includes a resumable streaming module 510 executed on the service 100 which acts as a streaming proxy for the wireless device 500. In response to a request from the wireless device 500 to stream video content, the resumable streaming module 510 initiates a connection to a remote streaming server 520 on behalf of the wireless device 500 using the set of protocols supported by the streaming server 520 and authentication information (e.g., user name and password) provided by the user. In one embodiment, the streaming server 520 streams video content using Real-time Transport Protocol ("RTP"), a standardized packet format for delivering multimedia content over the Internet, and the Real Time Streaming Protocol (RTSP), which allows a client to remotely control a streaming media server with VCR-like commands such as "play," "pause," "fast-forward," and "rewind." While the remainder of this detailed description will be described with respect to RTP/RTSP, it should be noted that the underlying principles of the invention are not limited to any particular set of protocols.

In operation, the resumable streaming module 510 stores video content received from the remote streaming server 520 within a buffer 551 and attempts to deliver the video content to a playback buffer 550 on the wireless device 500. Various different buffer types may be used including first-in-first-out (FIFO) buffers and circular buffers. Moreover, the buffers may be implemented using dedicated hardware or using a specified portion of a larger memory (e.g., such as system RAM). The underlying principles of the invention remain the same regardless of the hardware and software configuration used to implement the buffers. In addition, although illustrated as a single buffer 551 in FIG. 5, a separate receive buffer (for receiving content from the streaming server 520) and transmit buffer (for storing content prior to transmission to the wireless device 500) may be used.

When the wireless device 500 remains connected to service 100 via the wireless network, the resumable streaming module 510 temporarily buffers the video stream and forwards the video stream to the wireless device 500. A video player application 506 on the wireless device 500 then renders the video stream. In one embodiment, a resumable streaming module 505 on the wireless device 500 transmits an acknowledgement each time it successfully receives a packet of video data. The acknowledgement serves to notify the resumable streaming module 510 that it may remove or overwrite the video packet in its local buffer 551. In one embodiment, the packet of video data is an RTP packet.

In one embodiment of the invention, when the wireless device 500 loses its connection to the wireless network, the resumable streaming module 510 maintains a connection with the remote streaming server 520 on behalf of the user. As a result, the user is not forced to reestablish a connection to the remote streaming server 520 and begin the streaming process from the beginning each time the wireless device 500 moves out of range of the wireless network (e.g., when the user drives through a tunnel). In one embodiment, in response to detecting that the wireless device 500 has lost its connection, the resumable streaming module 510 issues a "pause" command to the remote streaming server 520 to pause the video playback. In one embodiment, the "pause" command is the RTSP PAUSE command. However, as mentioned above, the underlying principles of the invention are not limited to any particular protocol.

In an alternate embodiment, the resumable streaming module 510 does not issue the pause command as soon as it detects that the wireless device 500 has lost its connection. Rather, in this embodiment, it continues to receive the video stream from the remote streaming server 520 for a period of time. If the wireless device 100 does not reconnect to the wireless network following the period of time, the resumable streaming module 510 then issues the pause command.

When the wireless device 500 reconnects to the wireless network it transmits a notification to the resumable streaming module 510. In response, the resumable streaming module 510 streams video content to the wireless device 500 from the point where it left off (i.e., before the wireless device lost its connection). In one embodiment, the notification sent by the wireless device 500 identifies the video content successfully received prior to the lost connection. This may be accomplished in a variety of ways. For example, in one embodiment, the resumable streaming module 505 on the wireless device 500 tracks the number of bytes successfully received and the resumable streaming module 510 on the service 100 tracks the number of bytes transmitted. In this embodiment, the notification sent by the wireless device 500 indicates the number of bytes successfully received and the resumable streaming module 510 subtracts these values to determine (and re-transmit) the video content which was lost in transmission (i.e., the content which was transmitted but not received).

Alternatively, in one embodiment, the resumable streaming module 505 on the wireless device identifies the specific point in the video stream which has been received and/or rendered. For example, the resumable streaming module 505 may uniquely identify the last successfully received video packet (e.g., using a packet ID or sequence number). In response, the resumable streaming module 510 on the service transmits the video stream from the point identified by the resumable streaming module on the wireless device. Various other techniques may be used to identify the appropriate point from which to resume playback while still complying with the underlying principles of the invention.

In one embodiment, if the wireless device 500 does not reconnect to the wireless network within a specified period of time (e.g., 1 hour), then the resumable streaming module 510 disconnects from the remote streaming server. In some circumstances, however, the resumable streaming module 510 will be able to maintain the connection with the remote streaming server 520 for an extended period of time (e.g., by communicating with the server 520 to notify the server 520 that it is still "online"). In one embodiment, the connection with the remote streaming server 520 is a TCP socket connection employing a first set of network protocols and the connection with the wireless device 500 employs a second set of network protocols.

In addition to buffering the stream, the service may perform other operations to allow the stream to be rendered on the wireless device. For example, in one embodiment, the content conversion module 120 (described above with respect to FIG. 1) converts the video stream from a first format (in which it is received from the streaming server) to a second format which the wireless device can process. The type of conversion may depend on variables such as the current available bandwidth and the video processing capabilities of the wireless device. For example, if the wireless device is connected through a relatively low bandwidth wireless connection, then the content conversion module 120 may compress the video stream (more than it is already compressed) so that it may be sent to the wireless device. The content conversion module may also modify the format of the video stream to a format that the wireless device is capable of interpreting (e.g., MPEG-4, Real Video 8, etc.).

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although the embodiments described above are limited to a wireless implementation, the underlying principles of the invention may be employed in a variety of different types of networks. Similarly, while the protocol stack described above is implemented using RTP/RTSP, and TCP/IP the underlying principles of the invention are not limited to any particular type of streaming protocol stack. For example, in one embodiment UDP is used instead of TCP.

Accordingly, the scope and spirit of the invention should be judged in terms of the claims which follow.

What is claimed is:

1. A computer-implemented method comprising:
   receiving a video stream from a streaming server over a wireless network;
   storing the video stream in a buffer;
   streaming the video stream from the buffer to a wireless device;

detecting that the wireless device has lost communication with the wireless network;

continuing to receive the video stream from the streaming server and continuing to store the video stream in the buffer for a period of time;

sending a command to the streaming server to pause receiving the video stream from the streaming server and maintaining a network connection to the streaming server when the wireless device does not regain communication with the wireless network within the period of time;

determining a point within the video stream at which the wireless device lost communication responsive to detecting that the wireless device has regained communication with the wireless network within the period of time; and resuming streaming of the video stream to the wireless device at the determined point within the video stream.

2. The computer-implemented method of claim 1, wherein the network connection to the streaming server comprises a TCP or UDP socket connection.

3. The computer-implemented method of claim 1, wherein determining a point within the video stream at which the wireless device lost communication comprises receiving a notification from the wireless device indicating a point within the video stream of a last successfully received video packet.

4. The computer-implemented method of claim 3, wherein the notification comprises an indication of a number of bytes of the video stream successfully received by the wireless device.

5. The computer-implemented method of claim 4, wherein the determining comprises subtracting the number of bytes successfully received from a number of bytes transmitted to determine the point within the video stream of the last successfully received video packet.

6. The computer-implemented method of claim 3, wherein the notification comprises an identifier identifying the last successfully received packet.

7. The computer-implemented method of claim 1, further comprising converting the video stream from a first format to a second format prior to streaming the video stream to the wireless device.

8. The computer-implemented method of claim 7, wherein the second format comprises the video stream compressed at a relatively greater compression ratio than the first format.

9. The computer-implemented method of claim 1, wherein the streaming comprises streaming the video stream using Real-Time Transport Protocol and Real-Time Streaming Protocol.

10. A wireless device comprising:
at least a memory and a processor configured to perform operations comprising:
receiving, at the wireless device, a video stream over a wireless network from a streaming server;
losing communication with the wireless network, the losing communication causing a remote service to send a command to the streaming server to cause the streaming server to stop sending the video stream to the wireless device when the wireless device does not regain communication with the wireless network within a period of time; and
responsive to regaining communication with the wireless network within the period of time, resuming receiving of the video stream, at the wireless device, at a point within the video stream at which the wireless communication was lost.

11. The wireless device of claim 10, wherein the operations further comprise communicating a notification to the streaming server indicating a point within the video stream of a last successfully received video packet of the video stream.

12. The wireless device of claim 11, wherein the notification enables the streaming server to determine the point within the video stream at which the wireless communication was lost.

13. The wireless device of claim 11, wherein the notification comprises an indication of a number of bytes of the video stream successfully received by the wireless device.

14. The wireless device method of claim 13, wherein the notification causes the streaming server to subtract the number of bytes successfully received from a number of bytes transmitted to the wireless device to determine the point within the video stream of the last successfully received video packet by the wireless device.

15. The wireless device of claim 14, wherein the notification comprises an identifier identifying the last successfully received packet.

16. The computer-implemented method of claim 15, wherein the streaming comprises streaming the video stream using Real-Time Transport Protocol and Real-Time Streaming Protocol.

17. The wireless device of claim 10, wherein the video stream is streamed using Real-Time Transport Protocol and Real-Time Streaming Protocol.

18. A computer-implemented method comprising:
streaming, by a streaming server, a video stream to a wireless device over a wireless network;
receiving a command from a remote service to pause streaming the video stream to the wireless device responsive to the wireless device losing communication with the wireless network;
pausing streaming the video stream to the wireless device and maintaining a network connection to the remote service when the wireless device does not regain communication with the wireless network within a period of time; and
responsive to the wireless device regaining communication with the wireless network within the period of time, resuming steaming of the video stream to the wireless device at a point within the video stream at which the wireless communication was lost.

19. The computer-implemented method of claim 18, wherein the remote service maintains a connection with the streaming server on behalf of the wireless device when the wireless device loses communication with the wireless network.

20. The computer-implemented method of claim 18, further comprising determining the point within the video stream at which the wireless communication was lost based on a notification from the wireless device indicating a point within the video stream of a last successfully received video packet.

* * * * *